United States Patent [19]
Petschner

[11] Patent Number: 4,894,001
[45] Date of Patent: Jan. 16, 1990

[54] APPARATUS FOR PROCESSING SYNTHETIC THERMOPLASTIC MATERIAL

[75] Inventor: Goetz Petschner, Zollikon, Switzerland

[73] Assignee: Indupack AG, Zug, Switzerland

[21] Appl. No.: 254,387

[22] Filed: Oct. 5, 1988

[51] Int. Cl.$^4$ .............................................. B29C 47/60
[52] U.S. Cl. ................... 425/200; 264/211.21; 366/186; 425/204; 425/205; 425/208
[58] Field of Search ............... 425/200, 204, 205, 208, 425/376.1, 382.4; 264/211.21, 211.23, 37; 366/79, 87, 83-85, 165, 186, 194-196; 422/135, 137

[56] References Cited

U.S. PATENT DOCUMENTS

| 409,348 | 8/1889 | Cunningham | 425/205 X |
| 3,457,880 | 7/1969 | Eppenberger | 425/205 X |
| 3,528,782 | 9/1970 | Riggert et al. | 366/186 X |
| 3,548,903 | 12/1970 | Holly | 366/186 X |
| 3,867,194 | 2/1975 | Straube | 366/186 X |
| 3,920,229 | 11/1975 | Piggott | 425/205 X |
| 4,222,728 | 9/1980 | Bacher et al. | 264/211.21 X |
| 4,518,262 | 5/1985 | Bornemann et al. | 366/186 X |

FOREIGN PATENT DOCUMENTS 375867 9/1984 Austria .
45734 2/1982 European Pat. Off. .

Primary Examiner—Richard L. Chiesa
Attorney, Agent, or Firm—Herbert Dubno

[57] ABSTRACT

The apparatus for processing synthetic thermoplastic material includes a receiving container, containing a disintegrating and blending member, which is disposed near the bottom of the container and which rotates about the axis of the container and with which a screw extruder is in flow connection through an opening in the wall of the container. For a trouble-free, absolutely even and continuous charging of the screw extruder, irrespective of temperature and rotational speed, the arrangement is such that the cylinder, surrounding the extruder screw of the screw extruder, opens out with its front-end charging opening at least approximately tangentially in the inside wall of the receiving container.

1 Claim, 1 Drawing Sheet

APPARATUS FOR PROCESSING SYNTHETIC THERMOPLASTIC MATERIAL

BACKGROUND OF THE INVENTION

The present invention relates to an apparatus for processing synthetic thermoplastic material, comprising a receiving container, containing a disintegrating and blending member, which is disposed near the bottom of the container and which rotates about the axis of the container and with which a screw extruder is in flow connection through an opening in the wall of the container.

In such apparatus, the synthetic material, which is fed into the receiving container from above, is engaged, disintegrated and thoroughly blended by the disintegrating and blending members at the bottom area of the receiving container. This results in a heating of the material. On the one hand, the particles of material are moved by the disintegrating and blending members about the vertical axis of the receiving container along the wall of the container, on the other hand, it is subjected to a rotating motion so that, apart from a good blending action, a high thermal efficiency is also ensured.

The material thus processed, is then to be continuously delivered to the screw extruder and evenly discharged.

For this purpose, proposals have already been made to dispose the screw extruder radially to the axis of the container. In an apparatus known from EU-PS 0045734, the extruder cylinder with its charging opening extends far into the receiving container; whereas in an arrangement according to AT-PS 375867, the charging opening of the extruder is flush with the inside wall of the charging opening.

Both embodiment variants involve inflow techniques most unfavourable in regard to the synthetic material revolving in the receiving container, and they do not permit a consistent, continuous discharge.

SUMMARY OF THE INVENTION

Therefore, it is an object of the present invention to eliminate the aforementioned disadvantages and to provide an apparatus which is of the kind described first hereinbefore and which ensures a trouble-free, absolutely even and continuous charging of the screw extruder irrespective of temperature and rotational speed.

This is accomplished according to the invention in that the cylinder, surrounding the extruder screw of the screw extruder, opens out with its front-end charging opening at least approximately tangentially in the inside wall of the receiving container.

As a result of these steps, an even filling of the extruder screw is ensured by the tangential flow components in the rotating synthetic material, moving the latter into the area of the container wall that is broken by the front-end charging opening of the extruder cylinder and against the extruder screw, whereby the latter is filled.

Depending on the apparatus, the material to be processed, capacity and related factors, additional supporting measures may be taken.

Thus, it is absolutely possible that the front-end charging opening of the cylinder is flush with the inside wall of the receiving container, or that the front-end charging opening of the cylinder extends at least partially in the receiving container; the wall part of the cylinder, opposing the rotational flow in the receiving container, forming, thereby, a guiding wall for the deflection of the synthetic material into the cylinder.

Furthermore, the development may also be such that the free end of the extruder screw is set back in regard to the front-end charging opening, respectively the guiding wall of the cylinder.

In order to gain a further deflecting area, an additional provision may be such that the cylinder widens funnel-shaped at its area of connection opposing the flow in the receiving container.

BRIEF DESCRIPTION OF THE DRAWING

Embodiments of the present invention will now be more particularly described by way of example and with reference to the accompanying drawings, in which.

DETAILED DESCRIPTION OF THE PREFERRED EMBODIMENTS

Figure 1:
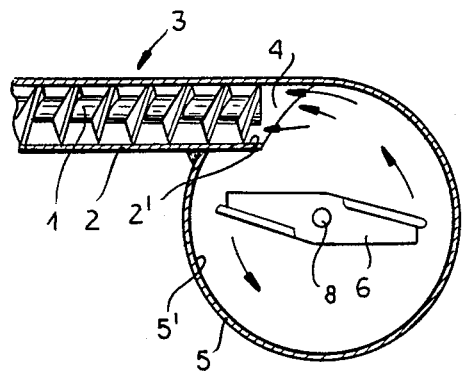
FIG. 1 is a vertical sectional view taken on a plane through the axis of the extruder of the apparatus for processing synthetic thermoplastic material according to the invention.
Figure 2:
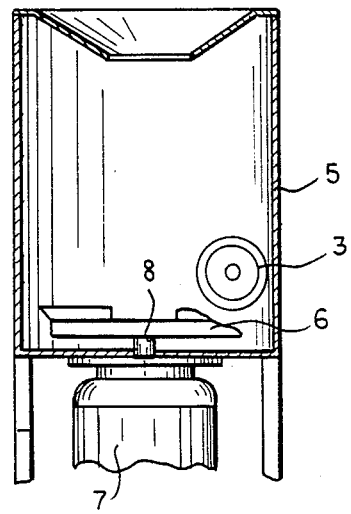
FIG. 2 is a vertical sectional view taken on a plane through the axis of the extruder of this apparatus.

The apparatus represented in FIG. 1 and 2 comprises essentially a receiving container 5, which contains a disintegrating and blending member 6, which is disposed near the bottom of the container and is mounted on the shaft 8 of a motor 7 and is rotated about the axis of the container by the motor. Above this disintegrating and blending member 6, a screw extruder 3 with its front-end charging opening 4 extends in the receiving container 5.

Essential to the invention in this connection is that the cylinder 2, surrounding the extruder screw 1 of the screw extruder 3, opens out with its front-end charging opening 4, at least approximately tangentially in the inside wall 5'.

Figure 4:
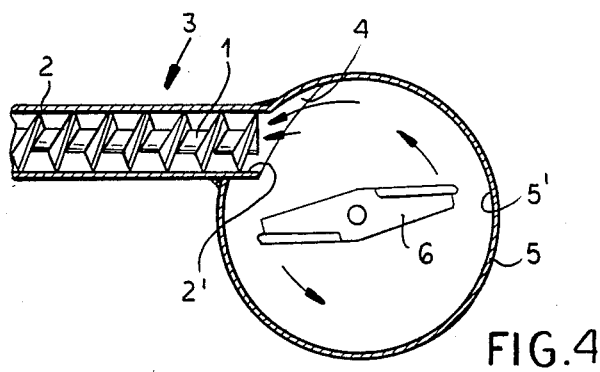
FIG. 4 is a further embodiment variant of the arrangement according to FIG. 1.

In the arrangement as shown in FIGS. 1 and 4, it is intended that the front-end charging opening 4 of the cylinder 2 extends at least partially in the receiving container 5; the wall part 2' of the cylinder 2, opposing the rotational flow in the receiving container 5, forming, thereby, a guiding wall for the deflection of the synthetic material into the cylinder.

The distinctions between the arrangements according to FIGS. 1 and 4 are that in the development according to FIG. 1, the cylinder 2 of the screw extruder 3 passes tangentially directly into the inside wall 5' of the receiving container 5; whilst in the development according to FIG. 4, the cylinder 2 is disposed parallel to the aforementioned according to FIG. 1. In this connection, the approximately tangential arrangement is functionally about equivalent to the direct tangential arrangement, but may, however, prove to be better constructionally.

However the case may be, the arrangement may be such that in both cases the free end of the extruder screw 1 is set back in regard to the front-end charging opening 4, respectively the guiding wall 2' of the cylinder 2.

Figure 3:
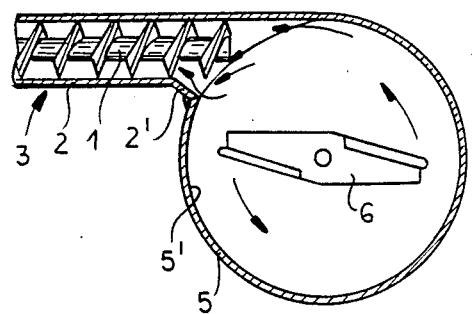
FIG. 3 is a first embodiment variant of the arrangement according to FIG. 1.

In addition, it can be advantageous, in place of the development according to FIGS. 1 and 4, to effect the arrangement according to FIG. 3, wherein the front-end charging opening 4 of the cylinder 2 is flush with the inside wall 5' of the receiving container 5.

In order to create here a deflecting guiding wall 2', the cylinder 2 may widen funnel-shaped at its area of connection opposing the flow in the receiving container 5, as is illustrated in FIG. 3.

In this manner, there results an apparatus for processing synthetic thermoplastic material which, by comparison with the known prior art, accomplishes an optimum filling of the discharging screw extruder in every operating condition.

Of course, in this connection, various modifications within the bounds of the basic idea of the present invention are possible. The main essential condition being the at least approximately tangential transition of the front-end charging opening of the extruder cylinder in the inside wall of the receiving container.

How far the cylinder extends, thereby, into the receiving container, whether it is then opened out funnel-shaped and where the screw extruder ends as regards the front-end charging opening of the cylinder, is subject to the requirements set on the material to be processed, the volume, the processing speed and such things.

While there are shown and described preferred embodiments of the invention, it is to be distinctly understood that the invention is not limited thereto but may be embodied and practised within the scope of the following claims. ACCORDINGLY,

What I claim is:

1. An apparatus for processing synthetic thermoplastic material comprising:
    a receiving container having an axis running along a longitudinal direction thereof, said container defined by a wall and having an opening therein;
    a disintegrating-blending member disposed near a bottom of said receiving container and rotatable about said axis; and
    a screw extruder comprising a screw within a cylinder, said cylinder having a front-end charging opening being in flow connection with said opening in said wall, said cylinder at its front-end charging opening intersecting said wall at a tangent thereto, said cylinder having a guiding wall forming part of said front-end charging opening extending at least partially into said receiving container opposing rotational flow in said receiving container to achieve deflection of synthetic thermoplastic material into said cylinder.

* * * * *

REEXAMINATION CERTIFICATE (2060th)
United States Patent [19]
Petschner

[11] B1 4,894,001
[45] Certificate Issued Jul. 13, 1993

[54] APPARATUS FOR PROCESSING SYNTHETIC THERMOPLASTIC MATERIAL

[75] Inventor: Goetz Petschner, Zollikon, Switzerland

[73] Assignee: Indupack AG, Zug, Switzerland

Reexamination Request:
No. 90/002,640, Feb. 18, 1992

Reexamination Certificate for:
Patent No.: 4,894,001
Issued: Jan. 16, 1990
Appl. No.: 254,387
Filed: Oct. 5, 1988

[51] Int. Cl.⁵ .................................................. B29C 47/60
[52] U.S. Cl. .............................. 425/200; 264/211.21; 366/186; 425/204; 425/205; 425/208
[58] Field of Search ............... 366/186, 77, 194–196, 366/79, 165; 127/5, 7; 425/205

[56] References Cited
U.S. PATENT DOCUMENTS

| | | | |
|---|---|---|---|
| 1,879,828 | 9/1932 | Smith et al. | 366/194 |
| 3,155,376 | 11/1964 | Mollenbruck | 366/77 |
| 4,222,728 | 9/1980 | Bacher et al. | 366/77 X |
| 4,460,277 | 7/1984 | Schulz et al. | 366/76 |

*Primary Examiner*—Tim Heitbrink

[57] ABSTRACT

The apparatus for processing synthetic thermoplastic material includes a receiving container, containing a disintegrating and blending member, which is disposed near the bottom of the container and which rotates about the axis of the container and with which a screw extruder is in flow connection through an opening in the wall of the container. For a trouble-free, absolutely even and continuous charging of the screw extruder, irrespective of temperature and rotational speed, the arrangement is such that the cylinder, surrounding the extruder screw of the screw extruder, opens out with its front-end charging opening at least approximately tangentially in the inside wall of the receiving container.

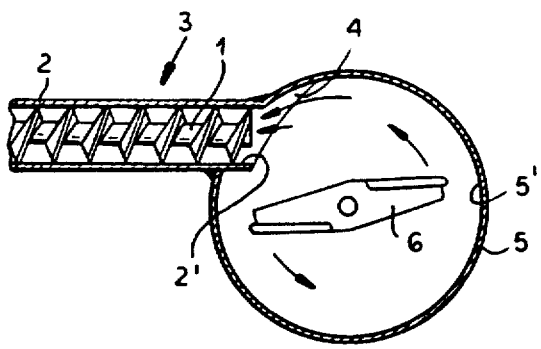

B1 4,894,001

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is cancelled.

New claim 2 is added and determined to be patentable.

2. *An apparatus for processing synthetic thermoplastic material comprising:*
*a receiving container having an axis running along a longitudinal direction thereof, said container defined by a wall and having an opening therein;*
*a disintegrating-blending member disposed near a bottom of said receiving container and rotatable about said axis; and a screw extruder comprising a screw within a cylinder, said cylinder having a front-end charging opening being in flow connection with said opening in said wall, said cylinder at its front-end charging opening intersecting said wall at a tangent thereto, said cylinder having a guiding wall forming part of said front-end charging opening extending at least partially into said receiving container opposing rotational flow in said receiving container to achieve deflection of synthetic thermoplastic material into said cylinder, said guiding wall being formed by a peripherally closed mouth of said cylinder, said mouth being within said container, a portion of said screw extending into said mouth in said container and said portion of said screw being entirely surrounded by said mouth.*

* * * * *